United States Patent

Teraoka

[11] Patent Number: 5,378,210
[45] Date of Patent: Jan. 3, 1995

[54] GEAR TRANSMISSION APPARATUS
[75] Inventor: Masao Teraoka, Tochigi, Japan
[73] Assignee: Tochigi Fuji Sangyo Kabushiki Kaisha, Japan
[21] Appl. No.: 995,804
[22] Filed: Dec. 23, 1992
[30] Foreign Application Priority Data Dec. 27, 1991 [JP] Japan ................ 3-107630[U]
Dec. 27, 1991 [JP] Japan ................ 3-347498

[51] Int. Cl.6 ............................................. F16H 3/44
[52] U.S. Cl. ................. 475/312; 475/318; 475/324
[58] Field of Search ........... 475/312, 313, 318, 319, 475/324, 325, 149, 154

[56] References Cited

U.S. PATENT DOCUMENTS

| | | | |
|---|---|---|---|
| 2,327,769 | 8/1943 | Claytor | 475/312 X |
| 2,369,976 | 2/1945 | Orr | 475/312 |
| 2,771,795 | 11/1956 | Orr | 475/312 X |
| 4,800,780 | 1/1989 | Sivalingam | 475/318 |
| 4,862,770 | 9/1989 | Smith | 475/324 |
| 4,938,738 | 7/1990 | Fuelberth et al. | |
| 5,139,468 | 8/1992 | Churchill et al. | 475/324 |

FOREIGN PATENT DOCUMENTS

| | | |
|---|---|---|
| 0128311 | 12/1984 | European Pat. Off. |
| 0204205 | 12/1986 | European Pat. Off. |
| 0430547 | 6/1991 | European Pat. Off. ............ 475/154 |
| 58-24605 | 5/1983 | Japan . |
| 58-173854 | 11/1983 | Japan . |
| 2091357 | 7/1992 | United Kingdom . |

Primary Examiner—Richard M. Lorence
Attorney, Agent, or Firm—Graham & James

[57] ABSTRACT

A gear transmission apparatus comprises a planetary gear mechanism having an internal gear, a plurality of pinion gears, a pinion carrier, and a sun gear. The pinion carrier has an overhang portion extending along an outer periphery of the internal gear. A bearing or bush is provided to support the overhang portion. A band brake is provided for braking the pinion carrier when brought into frictional contact with the overhang portion. A one-way clutch is interposed between the rotation input shaft and the rotation output shaft so as to allow rotation of the rotation output shaft in a speed-increase direction. In a preferred embodiment, either the sun gear or the internal gear is braked by the band brake.

9 Claims, 8 Drawing Sheets

{ #5,378,210 }

GEAR TRANSMISSION APPARATUS

BACKGROUND OF THE INVENTION

This invention relates to a gear transmission apparatus for use in a vehicle or the like.

An engine accessory drive apparatus is disclosed in Japanese Patent Publication No. 24605/1983. In this apparatus, an internal gear is coupled to a casing through an electromagnetic clutch to put a planetary gear mechanism into a speed-change state.

With the above-mentioned structure including the electromagnetic clutch, an electromagnet and a clutch portion must be located between the planetary gear mechanism and the casing. Accordingly, the apparatus inevitably has a large size in an axial direction. The internal gear located at the side of a brake is cantilevered and has a free end. Since no centering function of the free end is provided, the internal gear often becomes eccentric when subjected to an external Force from the electromagnetic clutch. In this event, normal engagement can not be maintained between the internal gear and other gears. This results in vibration, noise, deterioration of durability, and damage of the gears.

Japanese Utility Model Laid Open No. 173854/1983 discloses an engine accessory drive apparatus with a planetary gear mechanism. The disclosure is directed to a gear transmission mechanism. The planetary gear mechanism includes an internal gear, a pinion carrier, and a sun gear. One of the internal gear, a pinion carrier, and a sun gear is braked by a braking unit to provide a speed-change state.

The braking unit comprises a vacuum actuator. A vacuum may be derived from a vacuum pump or a suction side in an engine drive section. In any event, an output characteristic of an engine is unfavorably affected if the vacuum actuator is used. Alternatively, a hydraulic actuator may be used instead of the vacuum actuator. In this case, when an oil pump for lubrication of the engine is used in common for the hydraulic actuator, a risk of oil leakage increases because a hose is extended around to supply hydraulic fluid. The oil leakage often results in lubrication failure of the engine. On the other hand, installation of an additional oil pump is not desirable in view of an arrangement space. Thus, the above-mentioned structure with a pressure source is disadvantageous because the output characteristic of the engine is unfavorably affected. In addition, it is difficult to optionally incorporate such a structure as a post-fixial assembly because a wide range of modification is necessary including extension of a pressure supply pipe.

SUMMARY OF THE INVENTION

It is an object of this invention to provide a gear transmission apparatus with a planetary gear mechanism, which has a small size in an axial direction and which assures good engagement of gears.

It is another object of this invention to provide a gear transmission apparatus including a braking mechanism which minimizes an influence upon an engine and which can be easily incorporated as an optional assembly.

In order to accomplish the above-mentioned objects, this invention provides a gear transmission apparatus comprising:

a planetary gear mechanism having an internal gear, a plurality of pinion gears, a pinion carrier, and a sun gear;

a rotation input shaft rotationally integral with one of the internal gear, the pinion carrier, and the sun gear;

a rotation output shaft rotationally integral with one of the internal gear, the pinion carrier, and the sun gear that is not rotationally integral with the rotation input: shaft;

a braking mechanism for braking one of the internal gear, the pinion carrier, and the sun gear that is not rotationally integral with the rotation input shaft or the rotation output shaft; and a one-way clutch interposed between the rotation input shaft and the rotation output shaft so as to allow rotation of the rotation output shaft in a speed-increase direction.

In a preferred embodiment of this invention, the braking mechanism includes a band brake for braking one of the internal gear, the pinion carrier, and the sun gear when brought into frictional contact therewith.

In another preferred embodiment of this invention, the braking mechanism includes a motor as a drive source.

With the above-mentioned structure, when the band brake brakes the rotation of one of the internal gear, the pinion carrier, and the sun gear, the planetary gear mechanism is put into a speed-change state. Rotation from an input side is changed in speed and transmitted to an output side. When the band brake is released to put the one of the internal gear, the pinion carrier, and the sun gear into a rotation-free state, the rotation from the input side is kept unchanged in speed and transmitted to the output side in accordance with a rotation transmission direction of the one-way clutch.

Since the rotation of one of the pinion carrier, the sun gear, and the internal gear is braked by the band brake, functional parts can be arranged in a radial direction. As compared with the conventional apparatus having the electromagnetic clutch, this invention includes no such component arranged along an axial direction. Accordingly, the gear transmission apparatus according to this invention can be reduced in size in the axial direction. Generally, the pinion carrier or the sun gear often becomes eccentric in response to an external force from the band brake. According to this invention, the pinion carrier or the sun gear is centered through a bearing. In this connection, the gears are maintained in good engagement. It is thus possible according to this invention to prevent vibration, noise, deterioration of durability, and damage of the gears. In addition, operation sound is quiet because noise is shut off by presence of an overhang portion.

When the braking mechanism is driven by a motor, no direct influence is imposed on the engine and no supply pipe is necessary. Accordingly, the braking mechanism is highly adaptable as an optional assembly.

DESCRIPTION OF THE PREFERRED EMBODIMENT

FIRST EMBODIMENT

Figure 1:
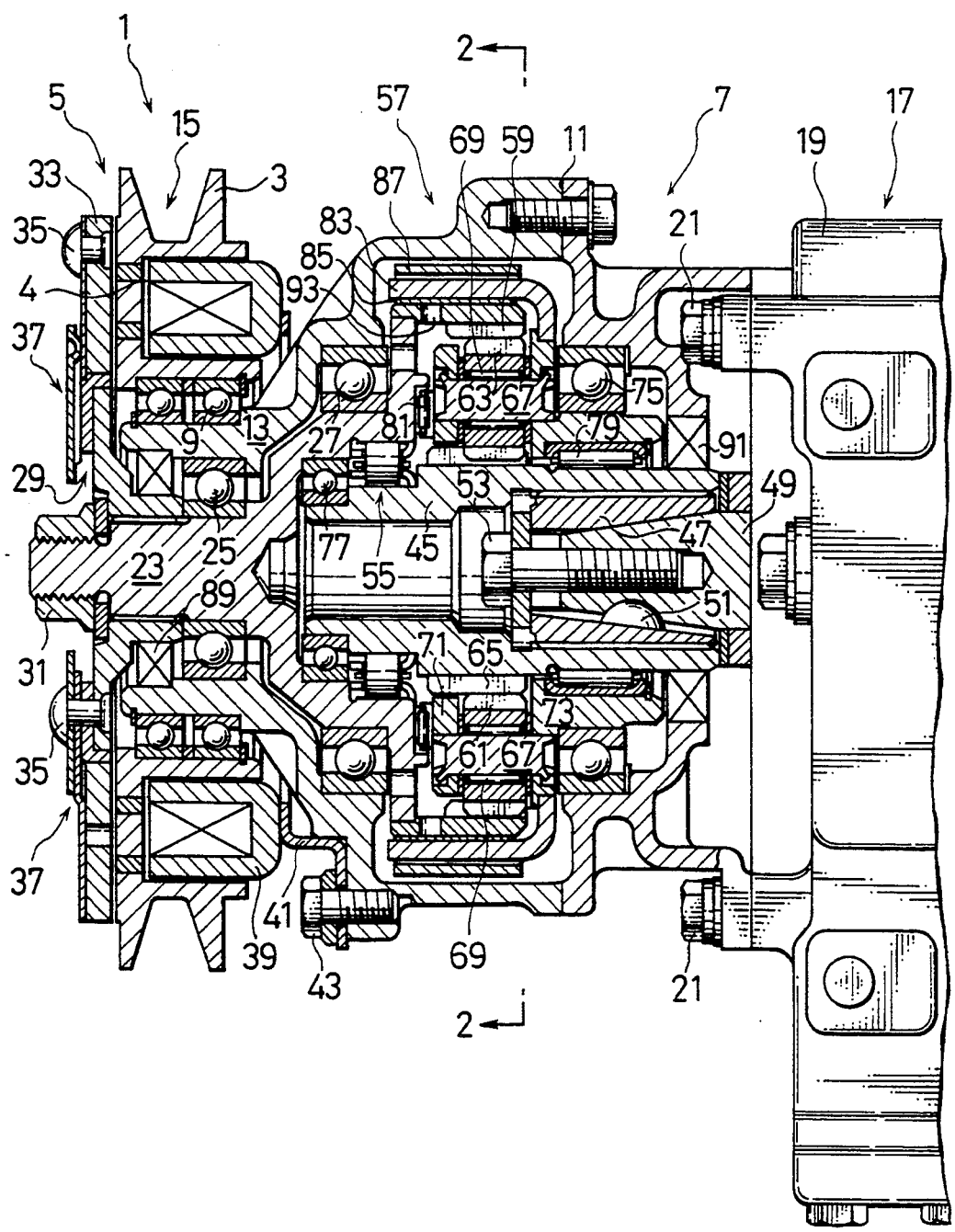
FIG. 1 is a sectional view of a gear transmission apparatus according to a first embodiment of this invention.

Referring to FIG. 1, description will be made as regards a gear transmission apparatus according to a first embodiment of this invention. The gear transmission apparatus is assembled into an accessory-side belt wheel (driven pulley) of a belt drive device for transmitting a rotation drive force of an engine to accessory units (such as an alternator and a compressor) in a vehicle. In the following description, leftward and rightward directions correspond to leftward and rightward directions shown in FIG. 1, respectively. Components with no reference numerals are not illustrated in the figure.

Referring to FIG. 1, a driven pulley 1 comprises a pulley 3, an electromagnetic clutch 5, and a gear transmission 7 according to the first embodiment.

The pulley 3 has a hollow portion 4 of a U-shaped section. An inner peripheral surface of the pulley 3 is supported through bearings 9 and 9 on an outer peripheral surface of a boss 13 of a casing 11. The pulley 3 is coupled to an engine-side belt wheel (drive pulley) through a belt received in a V-shaped groove 15 of the pulley 3 and is put into rotation by a driving force of an engine. The casing 11 is fixed to a casing 19 of an accessory unit 17 by means of bolts 21.

Inside the boss 13, an input shaft 23 is stably supported through bearings 25 and 27 with a wide span given between the bearings 25 and 27. A flange member 29 is spline-coupled to a left end of input shaft 23 and is prevented by a nut 31 from being removed. An armature 33 of a ring shape is arranged around an outer periphery of the flange member 29. A disc spring 37 is fastened by a rivet 35 to the armature 33 and the flange member 29 to couple the armature 33 and the flange member 29. An electromagnet 39 of a ring shape is received in the hollow portion 4 of the pulley 3 and is supported through a supporting member 41 fastened to the casing 11 by a bolt 43. Thus, an electromagnetic clutch is formed.

When the electromagnet 39 is supplied with a coil current, the disc spring 37 is bent by an attractive force of the electromagnet 89. Consequently, the armature 33 is pressed against the pulley 3 to couple the electromagnetic clutch 5. The rotation drive force of the engine is then transmitted to the input shaft 23. When the coil current is stopped, the armature 33 is forced by an urging force of the disc spring 37 to be returned leftwards in the figure. Thus, the electromagnetic clutch 5 is released to disconnect the input shaft 23 from the engine.

A hollow output shaft 45 is arranged at the right side in the figure of the input shaft 23 to be coaxial with the input shaft 23. A boss 47 is spline-coupled to an inner peripheral surface of the output shaft 45. An input shaft 49 of the accessory unit 17 is connected to the boss 47 through a Woodruff key 51 and is prevented by a bolt 53 from being removed. A one-way clutch 55 is interposed between the input shaft 23 and the output shaft 45.

A planetary gear mechanism 57 is arranged at the right side of the electromagnetic clutch 5. The planetary gear mechanism 57 comprises an internal gear 59, an outer pinion gear 61, an inner pinion gear 63, and a sun gear 65 which are engaged one to another in a sequential fashion. The outer pinion gear 61 is engaged with the internal gear 59 and the inner pinion gear 63. The inner pinion gear 63 is engaged with the outer pinion gear 61 and the sun gear 65. Each of the pinion gears 61 and 63 is supported through a bearing 69 on a pinion shaft 67. The pinion shaft 67 has opposite ends supported by left and right pinion carriers 71 and 73, respectively. The internal gear 59 is integral with a right end of the input shaft 23. The right pinion carrier 73 is supported on the casing 11 through a bearing 75. The sun gear 65 is formed on the output shaft 45. A left end of the output shaft 45 is supported by the input shaft 45 through a bearing 77 while a right end of the output shaft 45 is supported by the right pinion carrier 73 through a bearing 79. A bearing 81 is interposed between the left pinion carrier 71 and the input shaft 23 to prevent the sliding movement in the axial direction.

An overhang portion 83 is welded to the pinion carrier 73 and extends along an outer periphery of the internal gear 59. A bush (bearing) 85 is arranged between the overhang portion 83 and the internal gear 59. Thus, a free end (the overhang portion 83) of the pinion carrier 73 is received on the internal gear 59 stably supported as described above and is exactly centered. The sun gear 65 is stably supported because the sun gear 65 is held against the internal gear 59 and the pinion carrier 73 both of which are stably supported.

A band 87 of a band brake is arranged at an outer periphery of the overhang portion 83. The band 87 is for tightly clamping the outer periphery of the overhang portion 83 to lock the rotation of the pinion carriers 71 and 73. Thus, the planetary gear mechanism 57 Is put into a speed-change state.

Oil is enclosed in the casing 11. Seals 89 and 91 are inserted between the casing 11 and the flange member 29 and between the casing 11 and the output shaft 45, respectively, to prevent oil leakage. Accordingly, good lubrication is assured in engagement portions between the bearings and the gears in the casing 11. This improves durability of the gear transmission.

The oil is supplied through an oil passage 93 also to the bush 85.

Thus, the gear transmission 7 is formed.

Figure 2:
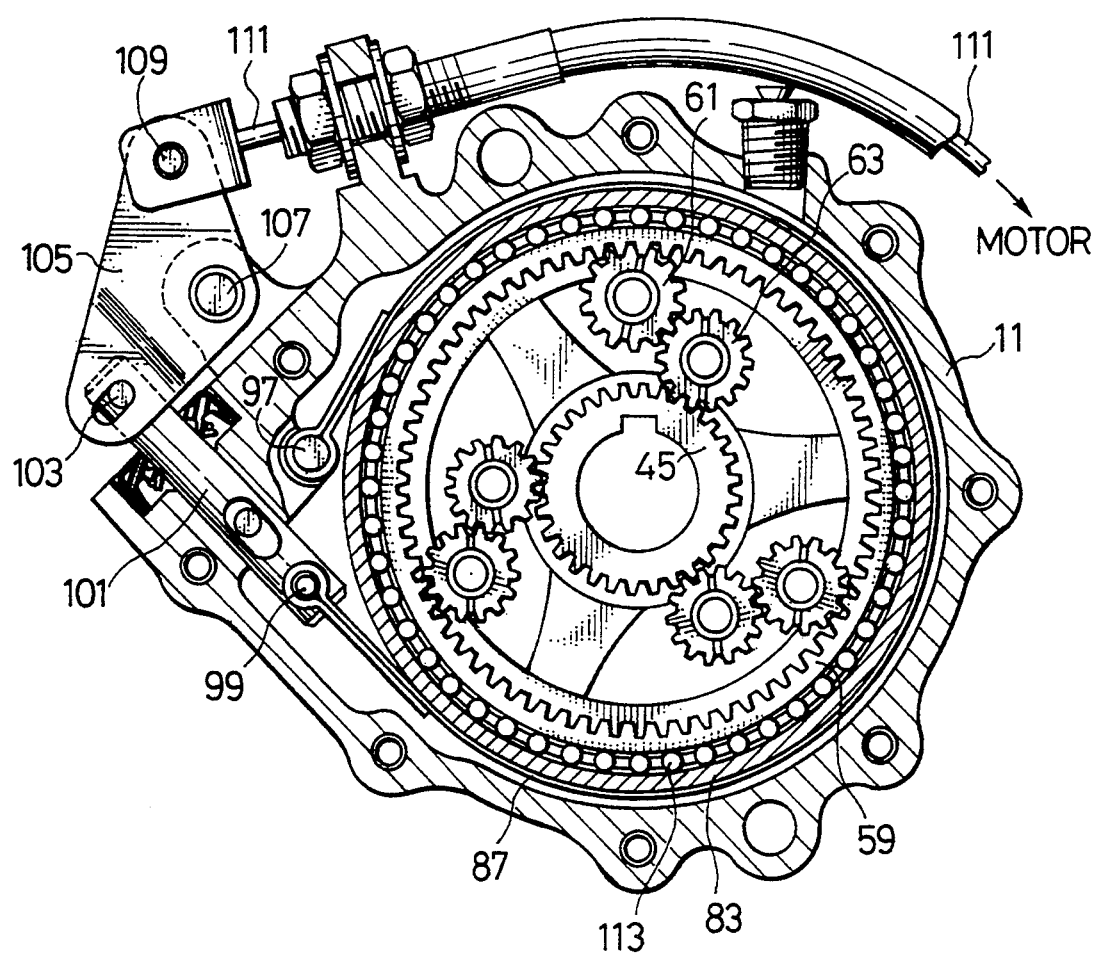
FIG. 2 is a sectional view of a band brake for use in the gear transmission apparatus according to the first embodiment of this invention, taken along a line 2—2 in FIG. 1.

FIG. 2 is a sectional view, taken along a line 2—2 in FIG. 1, for describing an example of the band brake. The band 87 extends along the outer periphery of the overhang portion 83 forming a drum portion of the band brake. One end of the band 87 is fixed to the casing 11 through a pin 97. Other end of the band 87 is connected through a pin 99 to one end of a link rod 101.

The link rod 101 is supported by the casing 11 to be movable along the axial direction. Other end of the link rod 101 is supported through a pin 103 by one end of a bell crank 105. The bell crank 105 is supported on the casing 11 to be rotatable around a center 107. Other end of the bell crank 105 is connected through a pin 109 to a wire 111. The wire 111 is connected to a motor.

In the band brake, when the wire 111 is pulled by the motor, the bell crank 105 is rotated around the center 107 to pull the link rod 101 along its axial direction. When the link rod 101 is moved along the axial direction, the band 87 is pulled to tightly clamp the overhang portion 83. The rotation of the pinion carrier 73 is braked by frictional contact between the band 87 and the overhang portion 83.

In FIG. 2, a needle roller bearing 113 is used instead of the bush 85 In FIG. 1. Other structure is similar to that illustrated In FIG. 1. Accordingly, the similar parts are designated by like reference numerals.

When the rotation of the pinion carriers 71 and 73 are locked by the band brake, the rotation of the engine supplied to the input shaft 23 (internal gear 59) is increased in speed and transmitted to the output shaft 45 (sun gear 65) to rotate the accessory unit 17. The one-way clutch 55 is arranged so as to allow the rotation in this situation. When the band brake is released, the pinion carriers 71 and 73 are put into a rotation-free state. In this event, the rotation of the input shaft 23 is kept unchanged in speed and transmitted through the one-way clutch 55 to the output shaft 45.

Unlike the conventional apparatus, the electromagnetic clutch for speed-change operation is not arranged at the side surface. In addition, braking operation is carried out by the overhang portion 83 formed at the outer periphery of the apparatus. In this connection, the gear transmission 7 is considerably reduced in size along the axial direction. As described above, the pinion carriers 71 and 73 or brake-side members, the internal gear 59, and the sun gear 65 are all stably supported. Accordingly, good engagement is established between the gears. As a consequence, engagement noise, vibration, and damage of the gears are avoided. Thus, gear noise is very small. In addition, any noise transmitted to the casing 11 is reduced by a shut-off effect of the overhang portion 83. Furthermore, the casing 11 surrounding the gear transmission 7 also has a noise shut-off effect. As a result, operation noise is quiet.

The overhang portion may be formed on the sun gear. The overhang portion may be supported between the casing 11.

SECOND EMBODIMENT

Figure 3:
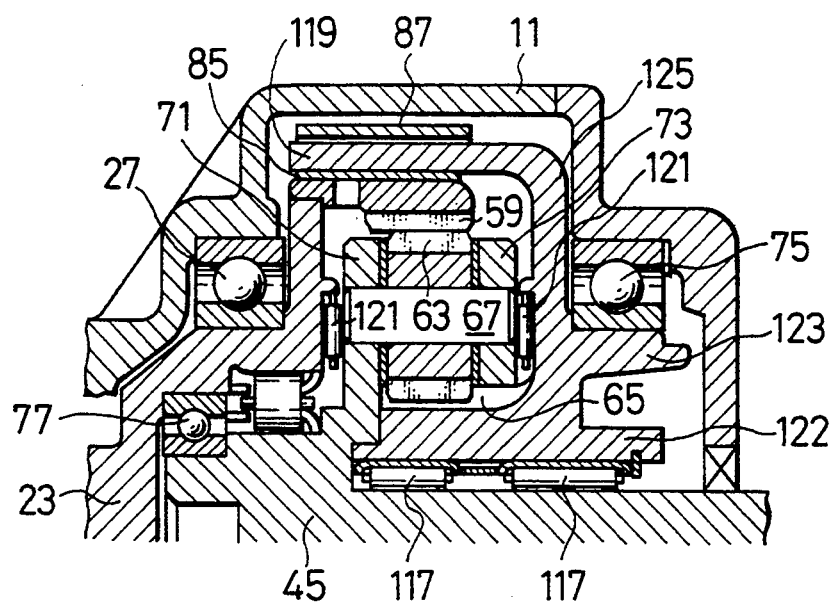
FIG. 3 is a sectional view of a gear transmission apparatus according to a second embodiment of this invention.

FIG. 3 is a partial sectional view of a gear transmission apparatus according to a second embodiment of this invention. In this embodiment, an overhang portion 119 is formed on the sun gear 69.

The output shaft 45 is provided with the pinion carriers 71 and 73 in a rotationally integral fashion. The pinion carriers 71 and 73 are supported through bearings 121 and 121 in the axial direction. The sun gear 65 has a boss 122 which is supported by the output shaft 45 through a bearing 117. On the other hand, the sun gear 65 has an axial support 123 supported on the casing 11 through a bearing 75. An extending portion 125 extends from the sun gear 65 in a radially outward direction. The overhang portion 119 is integrally formed on the extending portion 125.

In this embodiment, the rotation of the sun gear 65 is braked by frictional contact between the band 87 of the band brake and the overhang portion 119. As a result, the rotation of the input shaft 23 is increased in speed through the pinion gear 63 and transmitted to the output shaft 45.

THIRD EMBODIMENT

Next, description will be made as regards a gear transmission apparatus according to a third embodiment of this invention.

Figure 4:
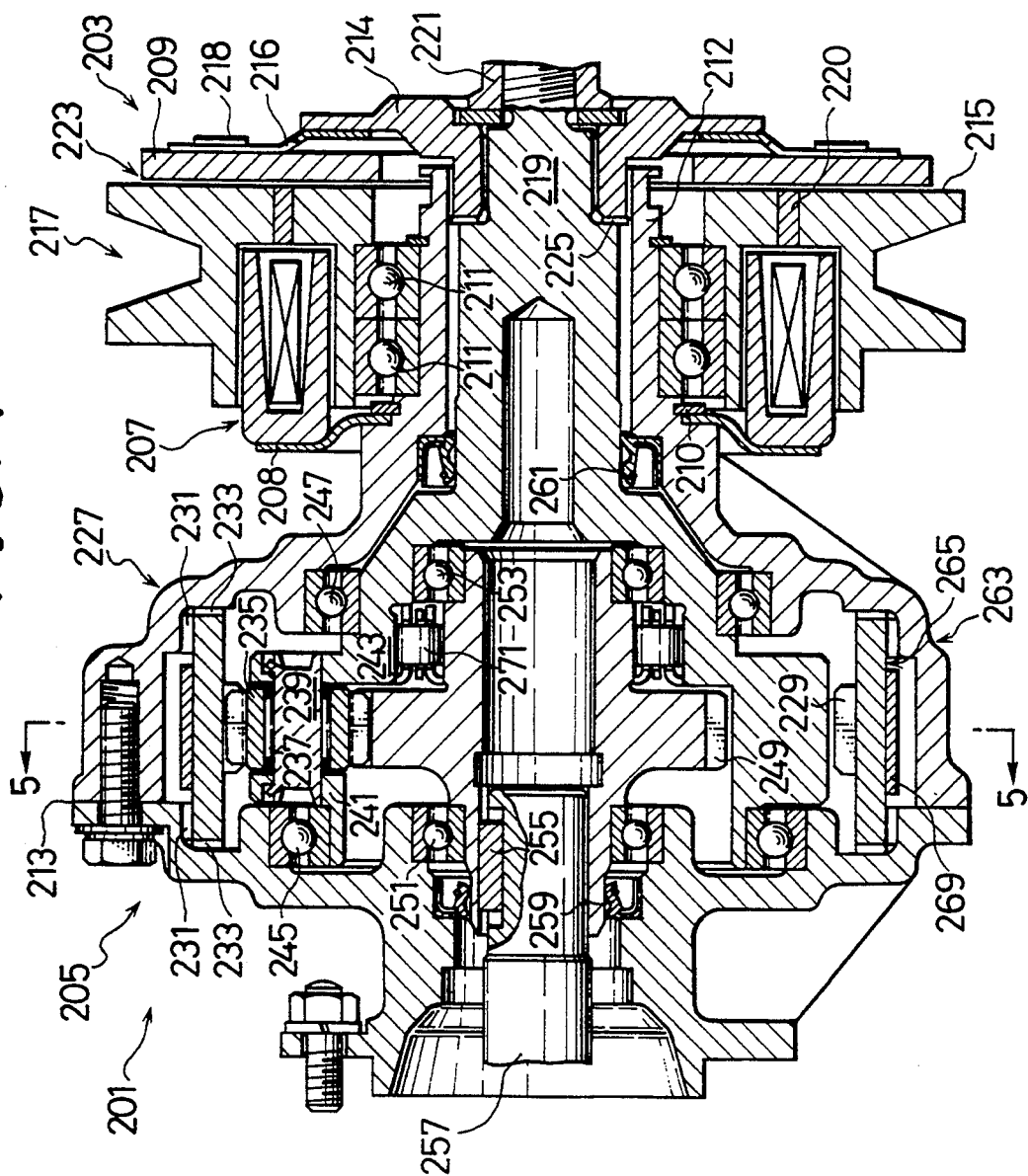
FIG. 4 is a sectional view of a gear transmission apparatus according to a third embodiment of this invention.

Referring to FIG. 4, a power transmission device 201 comprises an electromagnetic clutch 203 and a gear transmission mechanism 205 according to the third embodiment.

The electromagnetic clutch 203 has an electromagnet 207 and an armature 209. The electromagnet 207 is fixed by a snap ring 210 to a casing 213 of the gear transmission mechanism 205 through a support member 208. By means of a pin 218, the armature 209 is fixed through a leaf spring 216 to a flange member 214 spline-coupled to an input shaft 219 inserted into the casing 213. The flange member 214 is prevented by a nut 221 from being removed. A pulley 217 has a hollow portion of a U-shaped section. The electromagnet 207 of a ring shape is received in the hollow portion and supported by bearings 211 and 211 on a boss 212 of the casing 213.

When the electromagnet 207 is excited, magnetic flux is generated by the electromagnet 207, the pulley 217, and the armature 209. The armature 209 is brought into contact with the pulley 217 to be cooperatively rotated. Consequently, the electromagnetic clutch 203 is coupled. When excitation is stopped, the armature 209 is disconnected to release the electromagnetic clutch 203. A shim 225 is arranged between the armature 209 and the input shaft 219 to adjust a gap 223 between the armature 209 and a side surface portion 215 of the pulley 217. A reference numeral 220 represents a nonmagnetic member embedded in the pulley 217 to prevent short circuit of the magnetic flux.

A planetary gear mechanism 227 is arranged in the casing 213. An internal gear 229 is supported on the casing 213 through bearings 231 and 231 and thrust washers 233 and 233. Four pinion gears 235 are arranged equidistantly in a peripheral direction. Each pinion gear is supported through a bearing 237 on a pinion shaft 239. The pinion shaft 239 has opposite ends supported by left and right pinion carriers 241 and 243, respectively. The right pinion carrier 243 is integral with the input shaft 219. The left pinion carrier 241 is integral with the right pinion carrier 243. The pinion carriers 241 and 243 are supported on the casing 213 through bearings 245 and 247, respectively. A left end of a sun gear 249 is supported on the casing 213 through a bearing 251. A right end of the sun gear 249 is supported on the input shaft 219 through a bearing 253. The sun gear 249 is connected to a rotation shaft 257 of an accessory unit by means of a key 255. Seals 259 and 261 are inserted between the casing 213 and the sun gear 249 and between the casing 213 and the input shaft 219 respectively, to prevent oil leakage.

Figure 5:
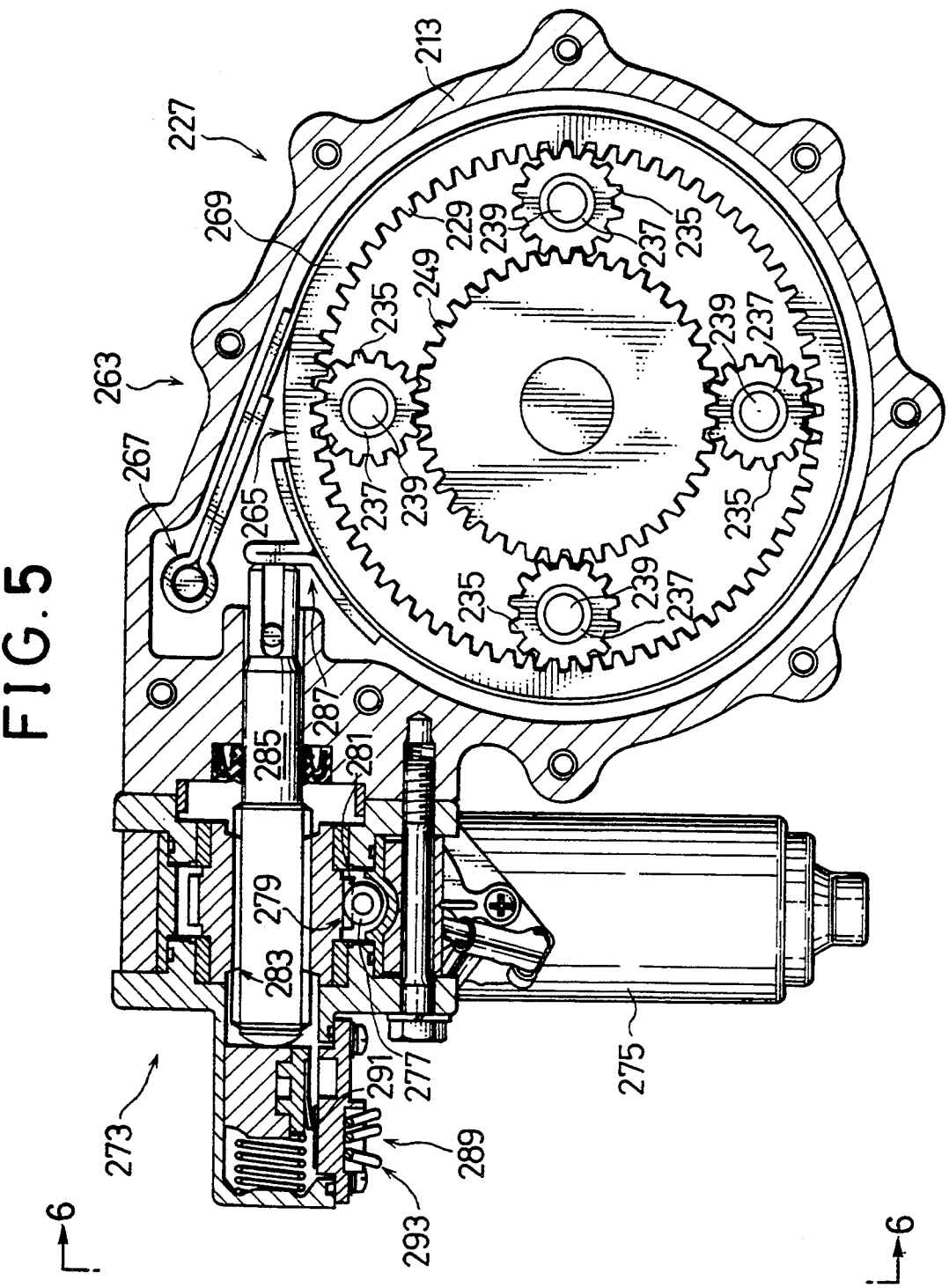
FIG. 5 is a sectional view taken along a line 5—5 in FIG. 4.

Referring to FIG. 5, an outer periphery of the internal gear 229 forms a drum portion 265 of a band brake 263 (braking mechanism). A band 269 having one end 267 fixed to the casing 213 is wound around the drum portion 265 to form the band brake 263.

When the band brake 263 is clamped, the internal gear 229 is locked to the casing 213. The rotation driving force of the engine supplied through the electromagnetic clutch 203 to the pinion carrier 243 is increased in speed by the planetary gear mechanism 227 to rotate the accessory unit through the sun gear 249 and the rotation shaft 257. As shown in FIG. 4, a one-way clutch 271 (clutch) is arranged between the pinion carrier 243 and the sun gear 249. The one-way clutch 271 is arranged so that the sun gear 249 is rotated prior to the pinion carrier 243 in a speed-increase state. When the band brake 263 is released, the pinion carrier 243 is supposed to be rotated prior to the sun gear 249 due to drive resistance at the accessory unit and the driving force of the engine. However, such relative rotation in this direction can not be allowed by the one-way clutch 271. Accordingly, the rotation of the pulley 217 is kept unchanged in speed and transmitted through the one-way clutch 271 to the accessory unit. Thus, two-stage transmission is carried out including speed-increase and speed-unchange states.

Figure 6:
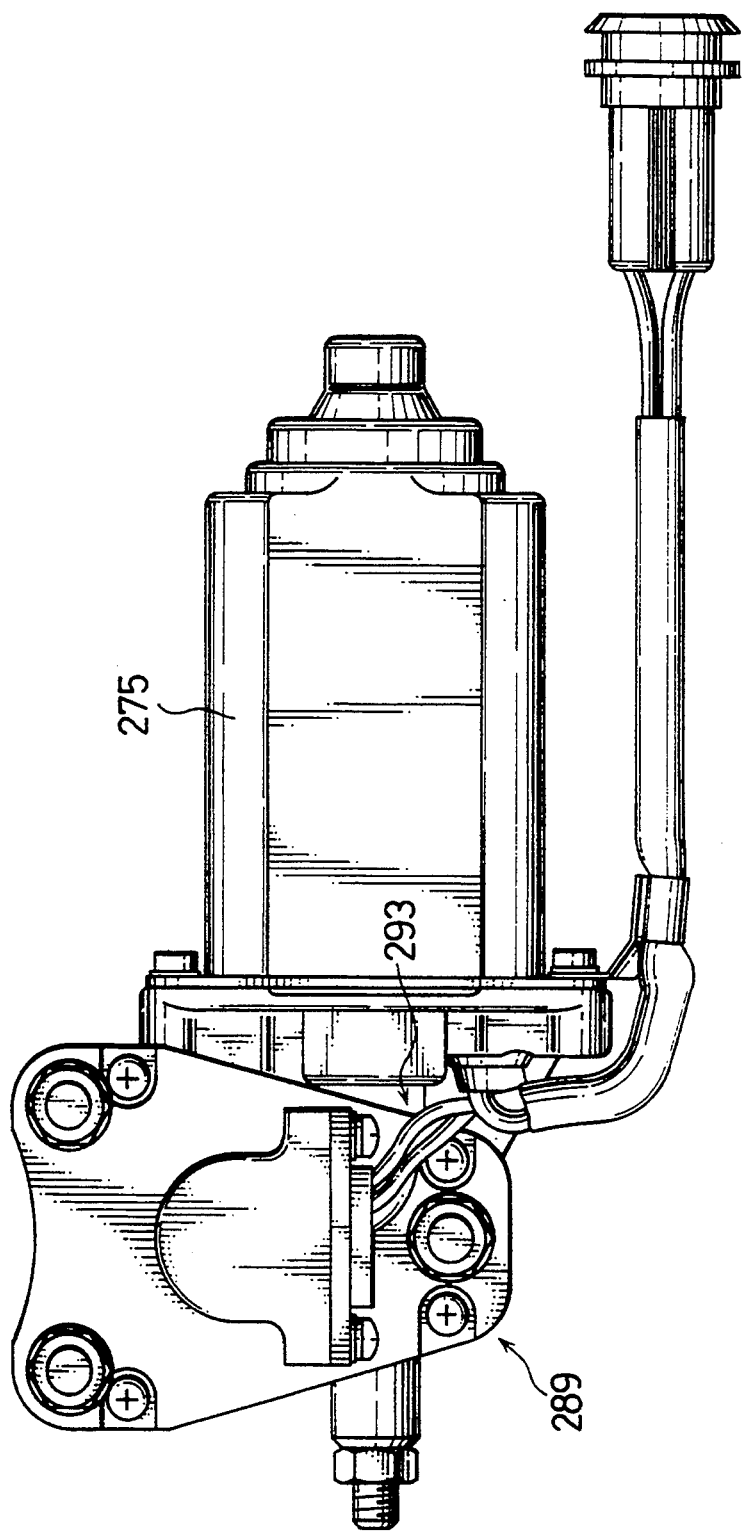
FIG. 6 is a sectional view taken along a line 6—6 in FIG. 5.

FIGS. 5 and 6 show a driving mechanism 273 for driving the band brake 263. In the driving mechanism 273, the rotation of a motor 275 is supplied through a worm 277 to a worm gear 279 to be decreased in speed and is converted through a worm wheel 281 and a screw 283 into a thrust force. The thrust force is transmitted to a push rod 285 to thereby press a free end 287 of the band 269. Thus, the band brake 263 is clamped to lock the internal gear 229. When the motor 275 is rotated in a direction reverse to that in a braking state, the push rod 285 is retracted to release the internal gear 229 from the band brake 263. In FIG. 5, the worm 277 is turned by 90 degrees to show a transversal section.

A locked (speed-increase) state and an unlocked (speed-unchange) state are detected by a contact 291 of a position sensor 289 cooperating with the push rod 285. The detected state is delivered through a signal line 293 to a control unit. For example, the detected state is indicated in front of a driver's seat in a vehicle.

Since the band brake 263 is driven by the motor, it is readily possible to control the gear transmission 205 according to this embodiment in relation to the electromagnetic clutch 203. Unlike the conventional apparatus, the engine characteristic is not affected and extension of a pressure supply pipe is unnecessary. Accordingly, optionality is improved and post-assembling can be made at any time on demand.

FOURTH EMBODIMENT

FIGS. 7A, 7B, 7C and 8 show a gear transmission apparatus according to a fourth embodiment of this invention. The band brake 263 is cooperatively coupled to a motor through a wire unit 307.

Figure 7:
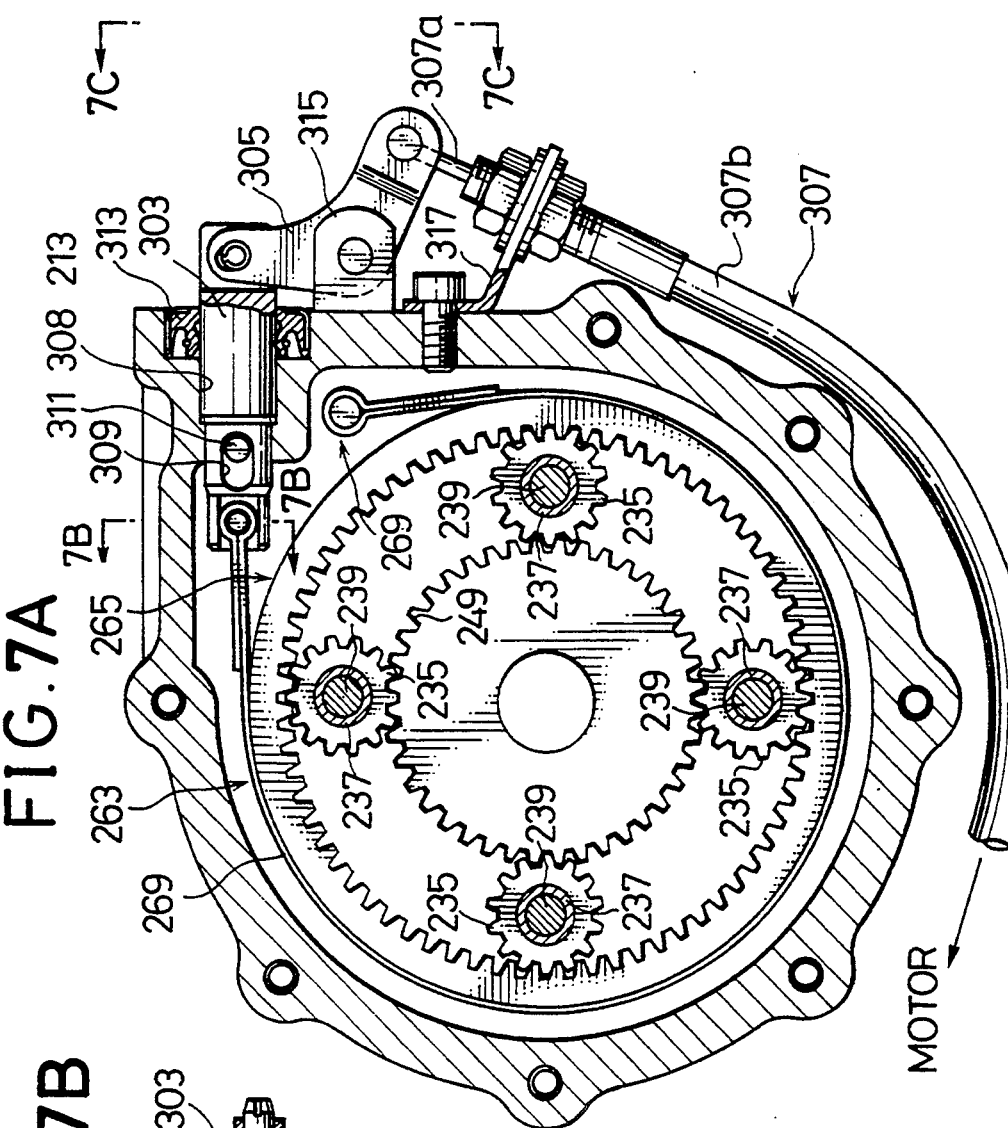
FIG. 7A is a sectional view of a gear transmission apparatus according to a fourth embodiment of this invention, taken along a line 7A—7A in FIG. 8.
FIG. 7B is a sectional view taken along a line 7B—7B in FIG. 7A.
FIG. 7C is a sectional view taken along a line 7C—7C in FIG. 7A.

As illustrated in FIG. 7B which is a sectional view taken along a line 7B—7B in FIG. 7A, the band 269 is coupled to one end of a link rod 303. Other end of the link rod 303 is coupled to one end of a bell crank 305 as illustrated in FIG. 7C which is a sectional view taken along a line 7C in FIG. 7A. Other end of the bell crank 305 is coupled to one end of a wire inner member 307a of the wire unit 307. Other end of the wire inner member 307a is coupled to a motor (not shown) so as to pull the wire inner member 307a.

The link rod 303 is supported in a support hole 308 of the casing 213. A guide hole 309 of the link rod 303 is fitted to a guide pin 311 of the casing 213 to prevent removal of the link rod 303. A gap between the casing 213 and the link rod 303 is sealed by a seal 313.

The bell crank 305 is rotatably supported by a bracket 315 of the casing 213.

In the wire unit 307, one end of a wire outer member 307b is supported by a wire bracket 317 fixed to the casing 213. Other end of the wire outer member 307b is supported by a fixed portion of the motor.

When the wire inner member 307a is pulled by driving the motor which is not shown, the band 269 is tightly fastened through the bell crank 305 and the link rod 303 to thereby lock the internal gear 229. Accordingly, the operation and the effect of the fourth embodiment is substantially similar to that described in conjunction with the foregoing embodiment.

Figure 8:
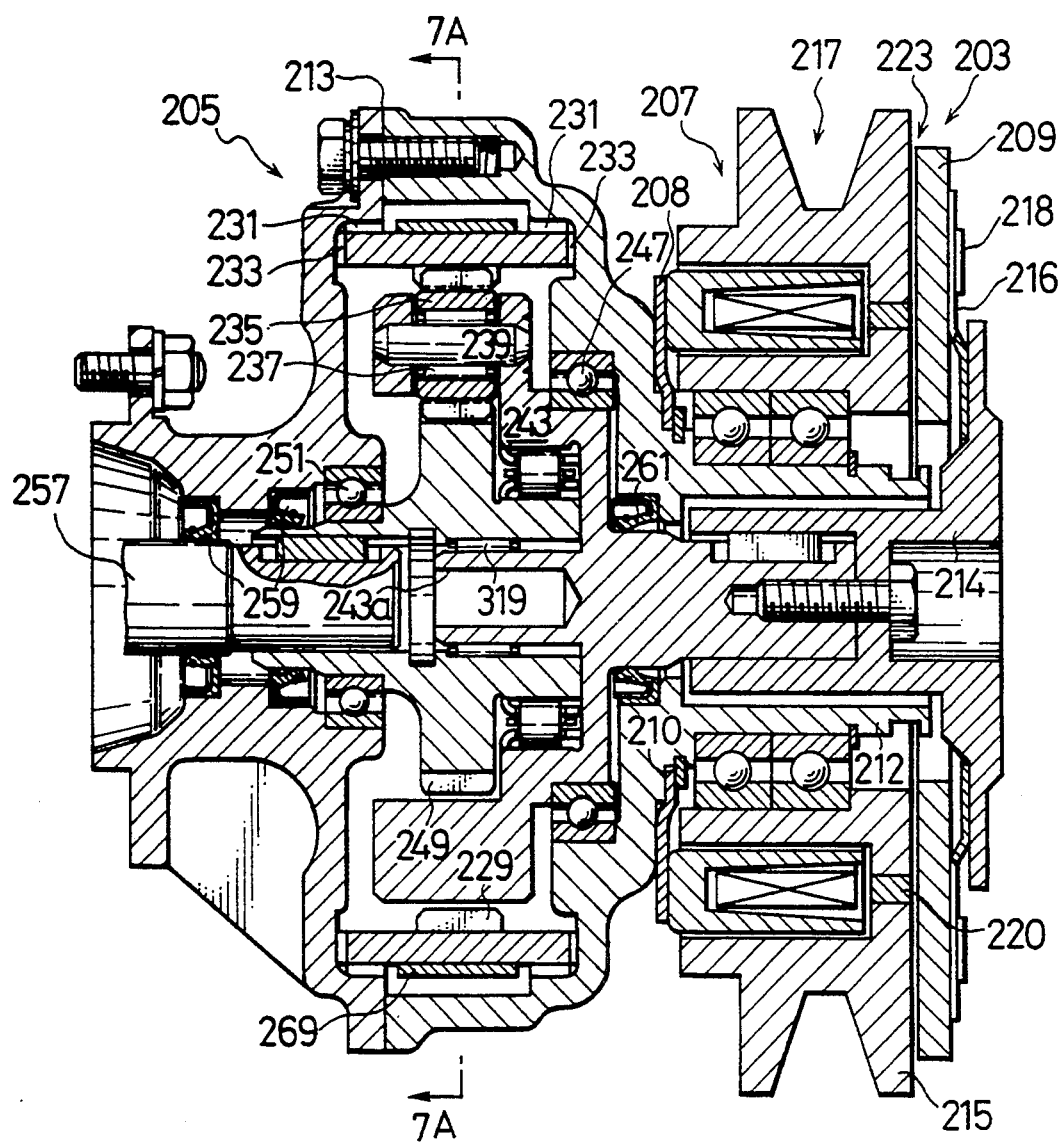
FIG. 8 is a sectional view of the gear transmission apparatus according to the fourth embodiment of this invention.

As is understood from FIG. 8, the gear transmission 205 has a structure substantially similar to those described in the foregoing embodiment except a support structure of the pinion carrier 243 and the sun gear 249. Specifically, a boss 243a is formed on the pinion carrier 243 at the side of the center axis. One side of the sun gear 249 is supported through a needle bearing 319 by the boss 243a. The outer periphery of the pinion carrier 243 is supported on the casing 213 through the bearing 247 alone. Accordingly, the length along the axial direction can be slightly reduced in this embodiment.

In the fourth embodiment, other structure is substantially similar to that described in the third embodiment. Similar parts are designated by like reference numerals and description thereof are omitted.

What is claimed is:

1. A gear transmission apparatus comprising:
    a planetary gear mechanism having an internal gear, a plurality of pinion gears, a pinion carrier, and a sun gear, said pinion carrier having an overhang portion rotatably supported through a bush or a bearing by said internal gear, the overhang portion extending along an outer periphery of said internal gear;
    a rotation input shaft rotationally integral with said internal gear;
    a rotation output shaft rotationally integral with said sun gear;
    a band brake for braking rotation for said pinion carrier when brought into contact with frictional contact with said overhang portion; and
    a one-way clutch interposed between said rotation input shaft and said rotation output shaft so as to allow rotation of said rotation output shaft in a speed-increase direction.

2. A gear transmission apparatus as claimed in claim 1, wherein
    said rotation output shaft is rotatably supported by said rotation input shaft and by said pinion carrier.

3. A gear transmission apparatus as claimed in claim 1, further comprising:
    a casing containing said planetary gear mechanism, said rotation input shaft, said rotation output shaft, said band brake, and said one-way clutch, said casing rotatably supporting said rotation output shaft and said pinion carrier.

4. A gear transmission apparatus comprising:
    a planetary gear mechanism having an internal gear, a plurality of pinion gears, a pinion carrier, and a sun gear, said sun gear having an overhang portion rotatably supported through a bush or a bearing by said internal gear, the overhang portion extending along an outer periphery of said internal gear;
    a rotation input shaft coupled with said internal gear;

a rotation output shaft coupled with said pinion carrier;

a band brake for braking rotation of said sun gear when brought into frictional contact with said overhang portion; and a one-way clutch interposed between said rotation input shaft and said rotation output shaft so as to allow rotation of said rotation output shaft in a speed-increase direction.

5. A gear transmission apparatus as claimed in claim 4, wherein said rotation output shaft is rotatably supported by said rotation input shaft and by said sun gear.

6. A gear transmission apparatus as claimed in claim 4, further comprising:

a casing containing said planetary gear mechanism, said rotation input shaft, said rotation output shaft, said band brake, and said one-way clutch, said casing rotatably supporting said rotation output shaft and said sun gear.

7. A gear transmission apparatus comprising:

a planetary gear mechanism having an internal gear, a plurality of pinion gears, a pinion carrier, and a sun gear;

a rotation input shaft rotationally integral with said pinion carrier;

a rotation output shaft rotationally integral with said sun gear;

a band brake for braking rotation of said internal gear when brought into frictional contact with said internal gear; and a casing containing said planetary gear mechanism, said rotation input shaft, said rotation output shaft and said band brake, said casing rotatably supporting said rotation output shaft through a bearing, rotatably supporting said pinion carrier through a bearing, and rotatably supporting said internal gear through a bearing at both ends thereof in an axial direction.

8. A gear transmission apparatus as claimed in claim 7, further comprising a one-way clutch interposed between said rotation input shaft and said rotation output shaft so as to allow rotation of said rotation output shaft in a speed-increase direction.

9. A gear transmission apparatus as claimed in claim 7, further comprising a one-way clutch disposed between the pinion carrier and the sun gear so as to allow rotation of the sun gear prior to the pinion carrier in a speed-increase state.

* * * * *